United States Patent [19]

Philippe et al.

[11] 4,451,206

[45] May 29, 1984

[54] BLADE END FOR ROTARY WING OF AN AIRCRAFT AND ROTARY WING PROVIDED WITH SUCH BLADE ENDS

[75] Inventors: Jean-Jacques Philippe, Versailles; Robert M. Lyothier, Miramas, both of France

[73] Assignees: Office Nationale d'Etudes et de Recherches Aerospatiales; Societe Nationale Industrielle Aerospatiale, both of Paris, France

[21] Appl. No.: 381,934

[22] Filed: May 26, 1982

[30] Foreign Application Priority Data

Jun. 5, 1981 [FR] France .................................. 81 11232

[51] Int. Cl.$^3$ ............................................. B64C 27/46
[52] U.S. Cl. ....................................... 416/228; 416/237
[58] Field of Search .......... 416/228 A, 228 R, 237 A, 416/242, 226

[56] References Cited

U.S. PATENT DOCUMENTS

| | | | |
|---|---|---|---|
| 3,399,731 | 9/1968 | Giles, Jr. ......................... | 416/237 A |
| 3,467,197 | 9/1969 | Spivey et al. .................... | 416/228 A |
| 3,721,507 | 3/1973 | Monteleone ...................... | 416/228 A |
| 4,077,741 | 3/1978 | Lowson et al. ................... | 416/228 A |
| 4,248,572 | 2/1981 | Fradenburgh ..................... | 416/228 |
| 4,334,828 | 6/1982 | Moffitt ........................... | 416/228 A |

FOREIGN PATENT DOCUMENTS

| | | | |
|---|---|---|---|
| 2315433 | 1/1977 | France ............................ | 416/228 A |
| 2067493 | 7/1981 | United Kingdom ................ | 416/228 |

*Primary Examiner*—Stephen Marcus
*Assistant Examiner*—Joseph M. Pitko
*Attorney, Agent, or Firm*—Merriam, Marshall & Bicknell

[57] ABSTRACT

The invention relates to a blade end for rotary wing of an aircraft, whose span is between 5 and 15% of the span of said blade. According to the invention, this blade end is charaterized in that, between points A and B', there is a stagger which, measured parallel to the span of the blade, is between 5 and 25% of the chord of the profile of the blade adjacent said blade end and in that the leading edge line of said blade end is curvilinear and such that its angle of sweep $\phi$ varies progressively and continuously from a low value $\phi_o$ near the blade, of between 0° and 30°, up to a high value $\phi_E$ towards the outside of the blade, of between 60° and 90°. The invention leads to increased performances and to a reduction in the noise level of rotary wings.

10 Claims, 7 Drawing Figures

BLADE END FOR ROTARY WING OF AN AIRCRAFT AND ROTARY WING PROVIDED WITH SUCH BLADE ENDS

The present invention relates to an outoard blade end or tip section for the rotary wing of an aircraft, and more particularly to a helicopter blade having a tip section whose span is between 5 and 15% of the span of said blade and such that its leading edge and its trailing edge extend the leading edge and the trailing edge of said blade respectively in sweepback, whilst the largest chord of said blade end is at the most equal to the chord of the profile of the blade adjacent said blade end and the end point of the leading edge of said blade end is located towards the rear beyond the line of span of the blade disposed in median position between the leading edge and the trailing edge thereof.

It is known that the outboard end or tip section of the blades of the rotor of an aircraft with rotary wings, particularly a helicopter, has considerable influence on the aerodynamic working of the rotor, both when the craft is hovering and advancing. In fact, the end of the blades constitutes the zone in which appear the greatest dynamic pressures and tip vortices which are generators of losses of power and of noise.

By improving the ends of the blades, the performance of the aircraft can be improved to a considerable extent, and numerous studies have been made on this subject.

For example, the author of French Patent No. 2 256 868 proposes making a blade end whose curved leading edge joins the leading edge of the blade to the trailing edge thereof. In this embodiment, in the vicinity of the blade end, the trailing edge of the blade remains parallel to the leading edge thereof and is longer towards the outside, said blade end being joined to the blade along an oblique plane with respect to the span of the blade. In this way, the end does not occupy any sweptback position with respect to the blade.

On the other hand, French Patent No. 2 311 713 describes a blade end wider than the corresponding part of the blade to which it is joined, and comprising in particular a outward projection of the leading edge. In this embodiment, the leading edge and the trailing edge of the blade end are curvilinear and have a slight sweepback. Moreover, the end point of the leading edge of this blade end is, in depth, located in the vicinity of the leading edge of the blade.

The blade ends described in French Patent Nos. 2 153 242, 2 397 328 and 2 408 518 comprise parallel rectilinear leading and trailing edges in sweep, so that these ends are in the form of a parallelogram. Finally, U.S. Pat. No. 4,248,572 describes a blade end in which the rectilinear leading edge and trailing edge are in sweepback, the leading edge being more inclined than the trailing edge, so that this end has a tapering form. In this embodiment, the end point of the leading edge is located towards the rear, beyond the median line between the leading edge and the trailing edge of the blade.

It is an object of the present invention to provide a blade end making it possible to considerably reduce the intensity or to prevent the formation of the shocks which appear on an advancing blade where the addition of the speeds of rotation of the blades and of advance of the aircraft is such that supersonic flow zones appear. The intensity of the shocks is proportional to the maximum speeds reached on the end of the blade, and it is therefore by reducing these excess speeds that it is possible to control the shocks. The essential object of the present invention is therefore to considerably reduce these excess speeds on the ends of the blades, due to a judicious shape of these ends in plan.

To this end, according to the invention, a blade end for rotary wing of an aircraft, whose span is between 5 and 15% of the span of said blade and such that, in plan, its leading edge and its trailing edge extend in sweepback the leading edge and the trailing edge of said blade respectively, whilst the largest chord of said blade end is at the most equal to the chord of the profile of the blade adjacent said blade end and the end point of the leading edge of said blade end is located towards the rear beyond the line of span of the blade disposed in median position between the leading edge and the trailing edge of said blade, said blade end tapering towards the outside, is noteworthy in that the point common to the leading edge line of the blade and to the leading edge line of the blade end is less remote from the axis of the rotary wing than the point common to the trailing edge line of the blade and to the trailing edge line of the blade end, so that, between said points, there exists a stagger which, measured parallel to the span of the blade, is between 5 and 25% of the chord of the profile of the blade adjacent said blade end, and in that the leading edge line of said blade end is curvilinear and such that its angle of sweep varies progressively and continuously from a small value near the blade of between 0° and 30°, up to a high value towards the outside of the blade of between 60° and 90°.

It has in fact been found that the combination of the four following features:

(a) a stagger towards the outside of the sweep of the trailing edge with respect to the sweep of the leading edge;

(b) a progressive rearward evolution of the leading edge line according to a mathematical law which causes a variation of the angle of local geometric sweep up to high values and brings the leading edge of the last section of the end clearly to the rear of that of the first section of the end;

(c) a trailing edge line also in sweepback and such that the local chords are close to or less than that of the first section of the end;

(d) an evolution of the local chords of the different profiles of this end bringing the chord of the last profile (end edge) to a value clearly less than that of the profile of the first section of the end; enabled the values of the local velocities of the fluid in contact with the end of the blade to be reduced so that the intensities of the shocks which appear on the known ends near the 90° azimuth, for high speeds of advance of the helicopter, are reduced, and even completely annulled.

In particular, the increase to high values of the angle of sweep of the leading edge line as a function of the position in span enables the zones in which the fluid is strongly accelerated and which exist on the ends of which the angle of geometric sweep of the leading edge line is constant near the end edge, to be virtually eliminated. These zones generate shocks in the vicinity of the advancing blade (90° azimuth) and the ends according to the invention constitute an improvement, from the aerodynamic point of view, of the known sweepback ends, which improvement produces a substantial reduction in the power to be supplied to the rotor.

The ends according to the invention having a sweepback trailing edge line make it possible to eliminate the risk of appearance of shocks on the outer edge of the end, which shocks would exist if the trailing edge line were in line with the current part of the blade or if it created too rapid a variation of the law of evolution of the chords of the end sections (law strictly descending).

The ends according to the invention, by eliminating or attenuating the shock waves for the azimuth corresponding to the sectors of the advancing blade, consequently produce much less noise, particularly in rapid advance flight.

The blade end is preferably such that, for its leading edge line, the variation of the angle of sweep along the span is at least approximately linear over at least the major part of said span.

This leading edge line may be such that the variation of the angle of sweep along the span is at least approximately linear in the central part of said end, whilst, at its two ends, the variation of the angle of sweep is more rapid that the linear variation: firstly with descending monotonic derivative, then with ascending monotonic derivative, according to the position in span.

Furthermore, the sweep back part of the trailing edge line may be rectilinear or substantially rectilinear; for example, for manufacturing imperatives, the trailing edge line may be constituted by rectilinear parts joined together.

In an advantageous embodiment, the blade end comprises two parallel end profiles orthogonal to the span of the blade, the inner end profile serving as connection to the blade and having a larger chord than the outer end profile, which is staggered rearwardly with respect to said inner end profile, the front ends of the chords of said profiles being joined by a leading edge line, such that its angle of sweep varies progressively and continuously from a low value near the blade up to a high value towards the outside of the blade, whilst the rear ends of the chords of said profiles are joined by a rectilinear trailing edge part extending the trailing edge line of the blade, followed by a rectilinear trailing edge part in sweepback. The span E, the chord c of the end profile, the distance m of the rear point of the outer end profile to the leading edge line of the blade, the distance l of the front point of the outer end profile to the leading edge line of the blade, and the distance d of the rear point of the outer end profile to the trailing edge line of the blade may be connected by the following relations:

$$0.3C \leq c \leq 0.7C \quad (1)$$

$$0.5C \leq E \leq 1.5C \quad (2)$$

with, preferably, $$0.7C \leq E \leq 1.1C \quad (3)$$

$$0.5C \leq l \leq C \quad (4)$$

$$1.1C \leq m \leq 1.5C \quad (5)$$

and $$0.1C \leq d \leq 0.5C \quad (6)$$

The twist of the blade end according to the invention advantageously consists in a pre-adjustment of the chord of its successive profiles, equivalent to a rotation effected about a point located on the chord of the profile considered at a distance equal to 25%±5% of the length of the chord, to the rear of the leading edge, the locus of the points about which the rotations are effected being located in a plane defined by the chord of the blade shank where twist is zero, and the axis of twist of the current part of the blade. This twist may be linear along the span of the blade end, but also non-linear.

The invention will be more readily understood on reading the following description with reference to the accompanying drawings, in which.

Figure 3:
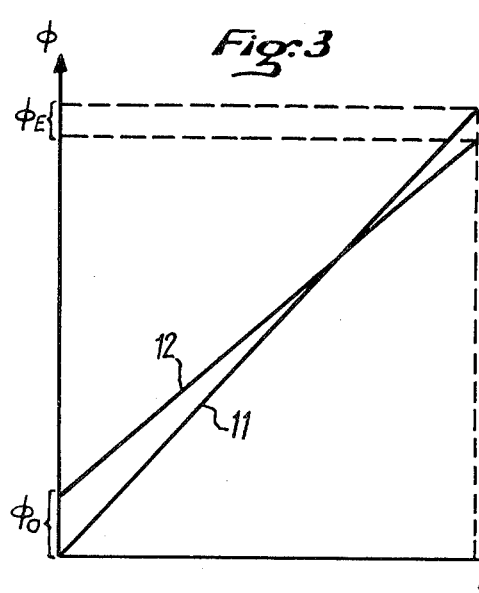
Figure 4:
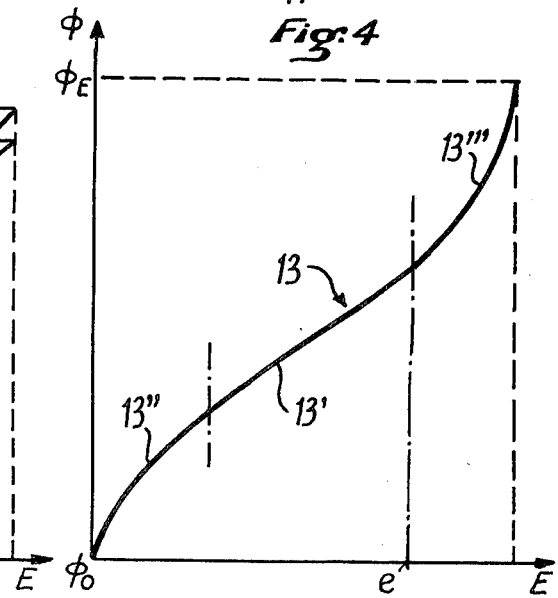

FIGS. 3 and 4 give, as a function of the span E, two examples of evolution of the angle of sweep of the leading edge of the blade end according to the invention.

Figure 5:
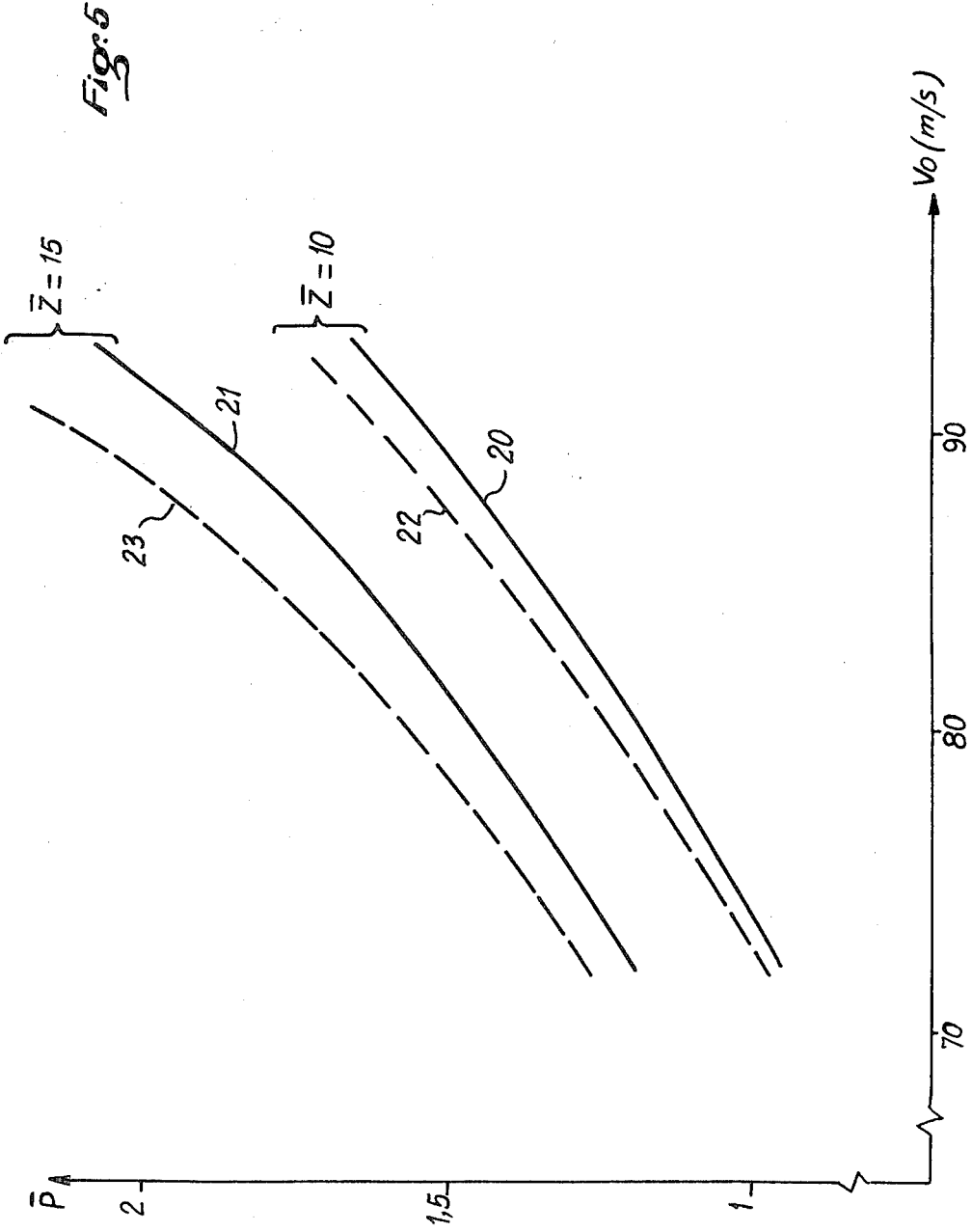
Figure 6:
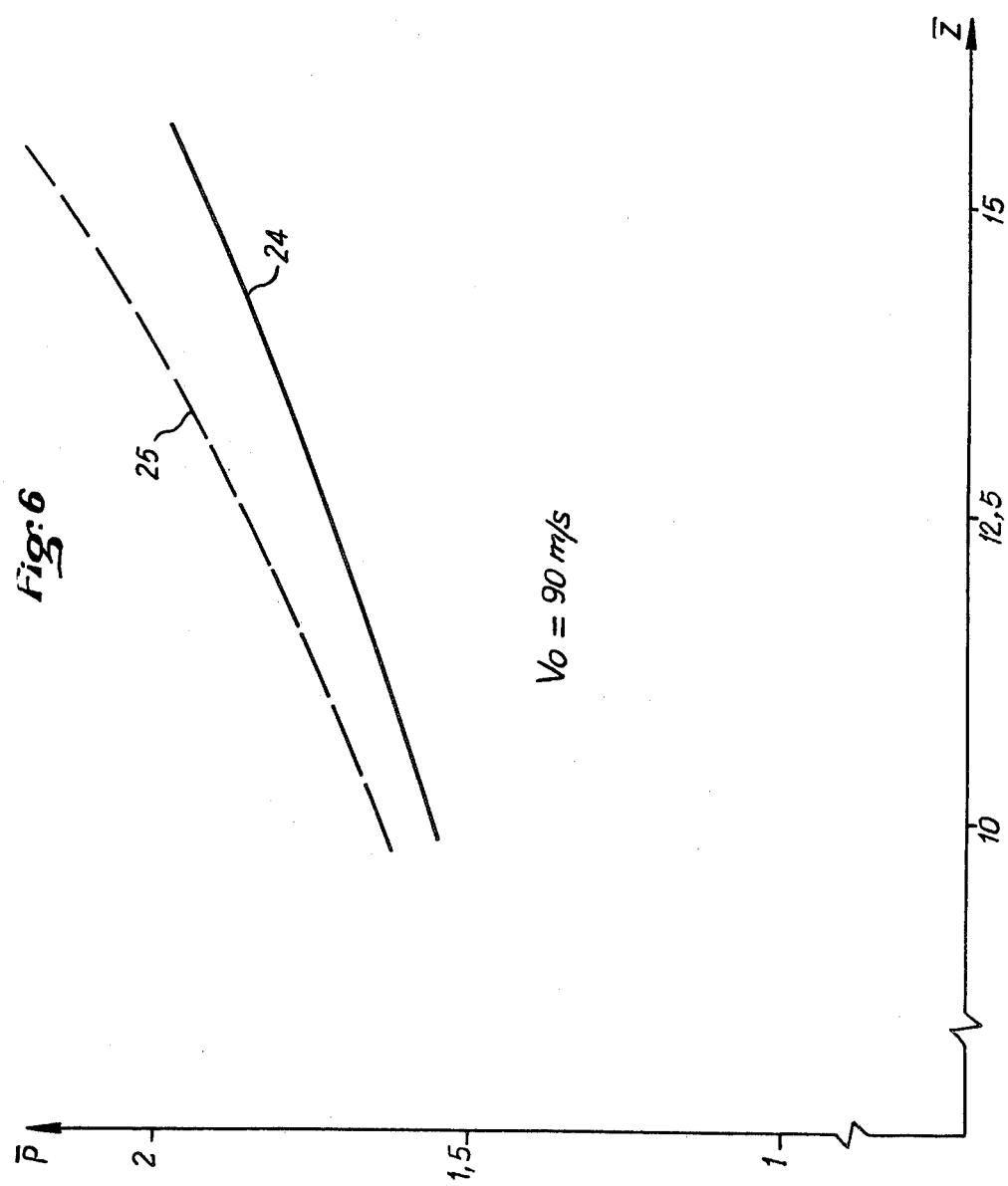
Figure 7:
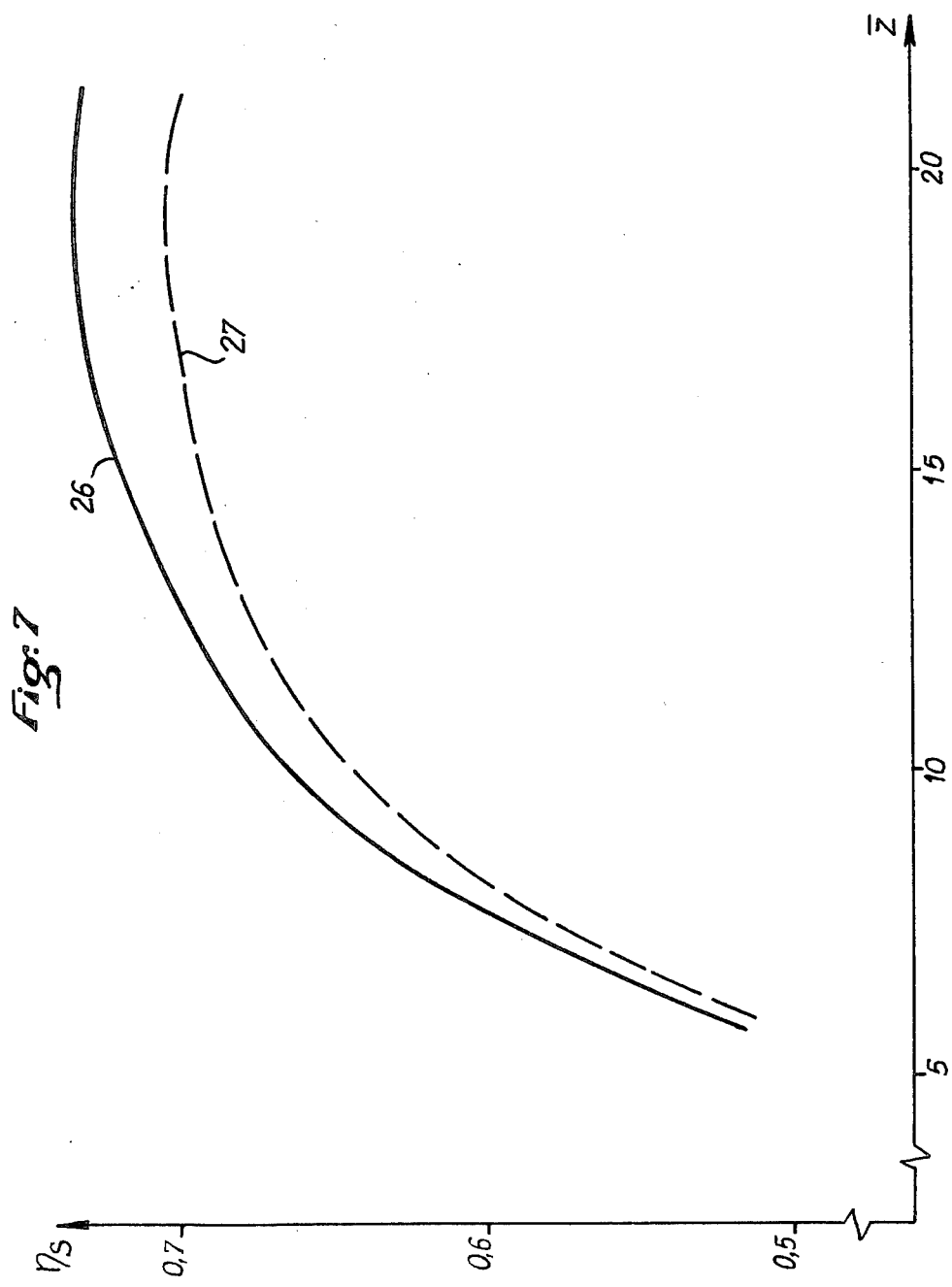

FIGS. 5, 6 and 7 give the results of comparative tests between a blade equipped with an end according to the invention and an identical blade with rectangular end.

Figure 1:
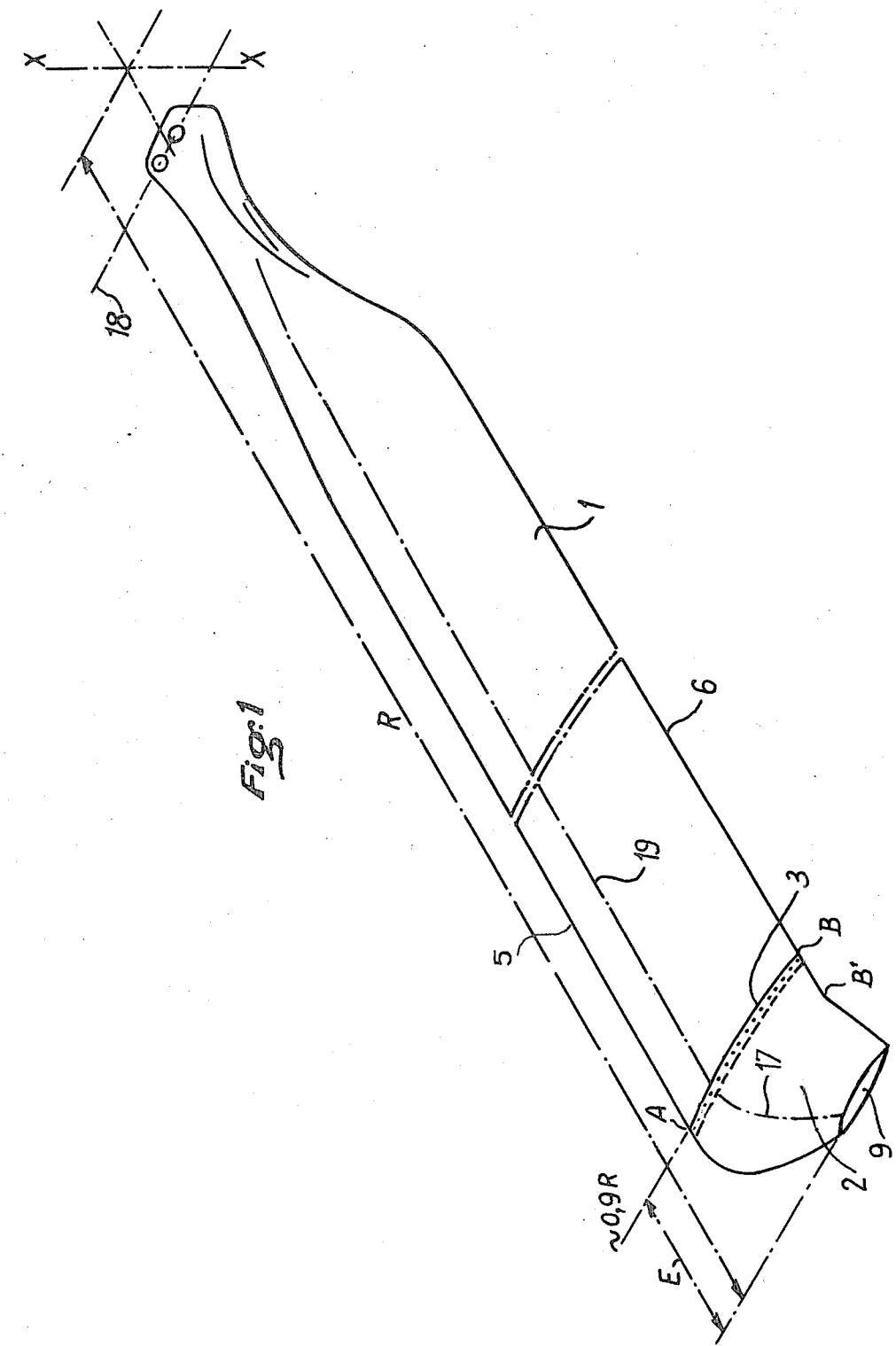
FIG. 1 is a schematic view in perspective of a helicopter rotor blade provided with a blade end according to the present invention.

Referring now to the drawings, the blade 1 according to the invention, shown in FIG. 1, forms part of a rotor of which the hub and the other blades have not been shown, this rotor rotating about an axis X—X. The blade 1 has a total length R and, at its outer end, it is provided with a blade end 2 according to the invention. For example, the blade end 2 begins at a distance which, measured from the axis X—X, is of the order of 0.9 R, the span E of this end then being of the order of 0.1 R.

In the example shown, the blade end 2 is joined to the rest of the blade 1 along a straight section 3 corresponding to a profile whose chord has a length C. However, as will be seen hereinafter, it would be possible to join the end 3 to the rest of the blade differently, for example along an oblique line 4 (cf. FIG. 2).

The blade 1 comprises a leading edge 5 and a trailing edge 6 defining, in plan, a leading edge line 7 and a trailing edge line 8 respectively.

At its end opposite the rest of the blade 1, the blade end 2 is defined by an end profile 9, whose plane is parallel to that of the profile 3. The profile 9 is smaller than the profile 3 and more to the rear (i.e. staggered towards the trailing edge) than said profile 3. For example, the chord c of the profile 9 is between 30% and 70% of the chord C of the profile 3, so that:

$$0.3C \leq c \leq 0.7C \quad (1)$$

Figure 2:
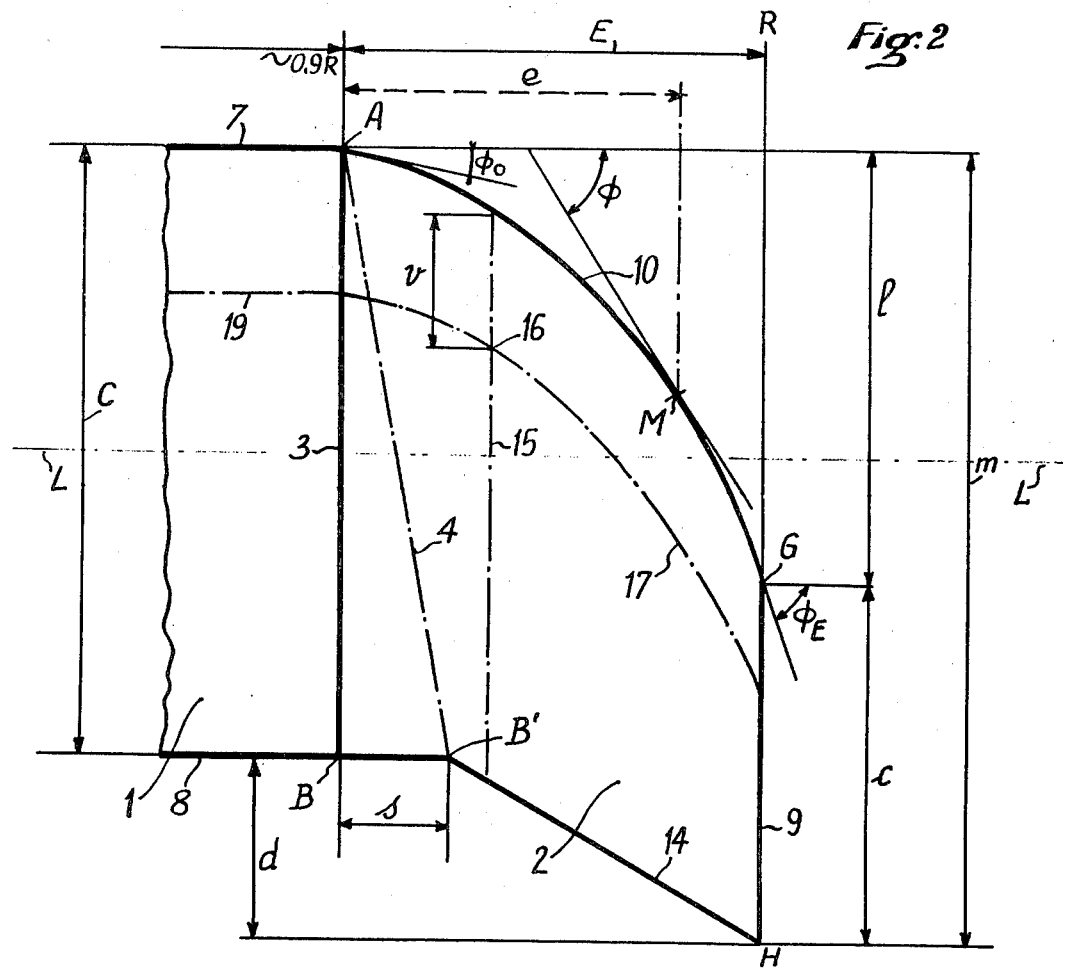
FIG. 2 is a schematic plan view of the blade end according to the invention.

In FIG. 2, the leading edge and trailing edge points of the profile 3 are respectively designated by A and B, whilst the corresponding points of the profile 9 bear references G and H.

The span E of the blade end 2 (i.e. the distance separating the sections 3 and 9) is chosen so that:

$$0.5C \leq E \leq 1.5C \quad (2)$$

with, preferably, $$0.7C \leq E \leq 1.1C \quad (3).$$

Furthermore, the retreat of the profile 9 with respect to the leading edge line 7 (i.e. the distance l of the point G to this line 7) is such that:

$$0.5C \leq l \leq C \quad (4)$$

so that the point G is located to the rear of the line of median span L—L of the blade 1.

The values of c and of l determined by relations (1) and (4) must moreover satisfy the following relations:

$$1.1C \leq m \leq 1.5C \quad (5)$$

with m=1+c, and $$0.1C \leq d \leq 0.5C \quad (6)$$

with d=m−c, d representing the amplitude of the sweep of the trailing edge.

Between points A and G, the leading edge line of the blade end 2 follows, in plan, a contour 10 such that the sweep angle φ of the current point M of this contour, follows a progressive evolution from low values up to high values.

FIGS. 3 and 4 show advantageous examples of variation of the angle of sweep φ as a function of the position in span e of the current point M, counted from point A.

In the diagram of FIG. 3, the leading edge line 10 is such that the angle of sweep φ varies linearly between two values $\phi_o$ and $\phi_E$, respectively representing the angles of geometric sweep of the end sections of the blade end 2. This results in that the leading edge line 10 presents a logarithmic evolution.

The outer sweep angles $\phi_o$ and $\phi_E$ must comply with the following conditions:

$$0° < \phi_o \leq 30° \quad (7)$$

and $$60° < \phi_E \leq 90° \quad (8)$$

with, preferably, $$0° < \phi_o \leq 15° \quad (9)$$

and $$70° \leq \phi_E \leq 85° \quad (10).$$

The straight line segment 11 of FIG. 3 shows and example of evolution for which $\phi_o=0$, whilst the straight line segment 12 of this FIG. 3 illustrates an example of evolution for which $\phi_o \neq 0$.

As a variant, the leading edge line 10 corresponding to diagram 13 of FIG. 4 is such that the leading angle of sweep φ varies substantially linearly in the central part of said leading edge line corresponding to part 13' of the curve 13, and non-linearly at the ends of line 10 (portions 13'' and 13''' of curve 13), the derivative firstly being monotonic and descending then monotonic and ascending, depending on the position in span.

Furthermore, the trailing edge line of the blade end 2 comprises, in plan, a linear portion 14, between a point B' and point H. Point B' is located on the trailing edge line 8 (or an extension thereof) and is staggered outwardly, with respect to point B, by a distance s.

The distance s must satisfy the following relation:

$$0.05C \leq s \leq 0.25C \quad (11)$$

In a first advantageous embodiment of the invention, corresponding to FIG. 3, the different parameters present the following values:

E=0.7 C
m=1.3 C
s=0.18 C
l=0.79 C
$\phi_o=0°$
$\phi_E=77.5°$

Similarly, in a second advantageous embodiment of the invention, corresponding to FIG. 4, the different parameters presented the following values:

E=0.7 C
m=1.3 C
s=0.1 C
l=0.8 C
$\phi_o=0°$
$\phi_E=90°$

The two end families 2 (the one corresponding to FIG. 3 and the one corresponding to FIG. 4) are therefore such that the trailing edge line 14 is swept back so that the trailing edge H of the profile of the last section 9 is clearly to the rear with respect to that 8 of the first section 3 of the end 2. This recession of the trailing edge is characterised by the value m which will have to be between 1.1 C and 1.5 C.

The starting point B' of the sweep of the trailing edge line 14 is located at a distance E−s from the chord of the last profile 9 of the end 2.

This retreat of the trailing edge line makes it possible to avoid the appearance of shocks on the outer edge of the end 2, which shocks would exist if the trailing edge line 14 were in line with that (8) of the current part of the blade 1.

The leading edge lines 10 and the trailing edge 8,14 of the two end families 2 according to the invention are such that the chords of the profiles of these ends firstly vary slowly (due to the smallow values of the angle $\phi_o$ on the one hand and the presence of the stagger B−B' on the other hand), then more and more quickly as a function of the position e in span of the section in question.

This final abrupt reduction of the chords of the blade end 2, combined with an adequate twist of said end, makes it possible to obtain a beneficial effect in advancing flight or whilst hovering, as, in this way, the trajectory of the tip vortex can be modified so as to minimize the vortical interactions.

Such an advantageous twist of the blade end 2 may consist in pre-adjustment of the chord 15 of each successive profile of this end by rotation about a point 16 located on the chord in question at a distance v equal to 35%±5% of the length of chord 15, to the rear of the leading edge line 10. The locus 17 of the points 16 about which these rotations are made is located in a plane defined by the blade shank chord 18 (cf. FIG. 1) where twist is zero, and the axis of twist 19 of the current part of the blade 1. This twist of the blade end 2 is preferably linear (i.e. the variation of the angle of twist is linear as a function of e) and negative (i.e. the point G of the profile 9 is lower than the point A of the profile 3). However, the law of twist and the direction of twist may be different, as a function of the desired applications; for example, point G may be higher than point A.

In order to show the influence of the shape in plan of the blade end 2 according to the invention along on the overall performance of a rotor, Applicants have made comparative wind-tunnel tests between two triple-blade rotors which are identical as far as the radius R of the rotor (R=0.857 m), the chord C (C=0.123 m), the linear twist at −12° and the profiles, are concerned. The only difference between these two rotors is that one was equipped with an end 2 according to the invention, whilst, for the other, the end of the blades was rectangular. FIGS. 5, 6 and 7 illustrate the results of these comparative tests, both concerning the advancing flight (FIGS. 5 and 6) and hovering (FIG. 7).

These tests employ, on the one hand, a coefficient of power $\overline{P}$ defined as being the ratio $$\overline{P} = \frac{100P}{\frac{1}{2}\rho(\omega R)^3 S\sigma}$$

and, on the other hand, a coefficient of lift $\overline{Z}$ defined as being the ratio $$\overline{Z} = \frac{100F_Z}{\frac{1}{2}\rho(\omega R)^2 S\sigma}$$

with
P=power furnished to the rotor
$\rho$=density of the air
$\omega$R=peripheral speed of the rotor
S=surface of the rotor in rotation
$\sigma$=(3 C/$\pi$ R) solidity of the rotor
and
$F_Z$=lift of the rotor.

FIG. 5, which gives the evolution of the coefficient $\overline{P}$ significant of the power to be supplied to the rotors as a function of the wind velocity Vo in the wind tunnel for two levels of lift $\overline{Z}$ (10 and 15), shows that the rotor provided with blades according to the invention (curves 20 and 21) is better than the rotor with blades with rectangular end (curves 22,23), since, for a determined velocity Vo, the rotor with blades according to the invention requires less power. The gain in power may attain from 5 to 8%.

FIG. 6 shows the evolution of the coefficient of power $\overline{P}$ as a function of the lift demanded thereof at Vo=90 m/s. At all useful levels of lift of the rotors, the one equipped with blades according to the invention (curve 24) is of higher performance than the one with blades with rectangular ends (curve 25). Finally, FIG. 7, which gives the lifting efficiency $\eta_s$ as a function of the lift $\overline{Z}$, shows that, when hovering, the blade end according to the invention (curve 26) ensures for the rotor a lifting efficiency (ratio of the theoretical Froude power to the real power supplied to the rotor) greater than that of the blades with rectangular end (curve 27) whatever the lift demanded of the rotor.

What is claimed is:

1. A helicopter rotor blade of selected span having a leading edge, a trailing edge, a chord dimension extending between said edges, as inboard blade section having an inner end adapted to be attached to a hub for rotation therewith about an axis, and an outboard tip section at the outer end of said inboard blade section, said tip section having a span which is 5-15% of the span of said blade, and a leading edge and a trailing edge which form extensions of the leading edge and trailing edge respectively of said inboard section, said tip section having a maximum chord which is not larger than the chord of the outer end of said inboard blade section adjacent said tip section, said tip section being tapered so that its chord diminishes towards its outboard end, the leading edge of said tip section being swept rearwardly from a first point of juncture with the leading edge of said inboard blade section to a terminal point which is disposed rearwardly of a line of span midway between the leading and trailing edges of said inboard blade section, the leading edge of said tip section being curvilinear and having a sweep angle $\phi$ which varies progressively and continuously from a value of 0°-30° at said first point of juncture to a value of 60°-90° at said terminal point, the trailing edge of said tip section including a first inboard portion which forms a colinear extension of the trailing edge of said inboard blade section and a second outboard portion which is swept rearwardly relative to the trailing edge of said inboard section, said first and second portions meeting at a second point of juncture which is more remote from said axis of rotation than is said first point of juncture, the distance between said first and said second points of juncture, measured along a line parallel to the span of said blade, being 5-15% of the chord of the outboard end of said inboard blade section.

2. A rotor blade in accordance with claim 1, wherein said angle of sweep $\phi$ varies at least approximately linearly over the major portion of the span of said tip section.

3. A rotor blade in accordance with claim 1, wherein said sweep angle $\phi$, plotted as a function of the span of said tip section has a derivative which is monotonic and decreasing in a first inboard portion of said tip section adjacent the outboard end of said inboard blade section, isotonic and increasing in an outboard portion of said tip section adjacent its outboard end, and substantially constant in a central portion interconnecting said inboard and outboard portions.

4. A rotor blade in accordance with claim 1, in which the second outboard portion of the trailing edge of aid tip section is rectilinear.

5. A rotor blade in accordance with claim 1, wherein said tip section comprises an outer profile at the outboard end of said tip section and an inner profile adjacent the outer end of said inboard blade section, said profiles being parallel and orthogonal to the span of the blade, the chord of said inner profile being larger than that of said outer profile, the outer profile being displaced rearwardly with respect to said inner profile, the front ends of the chords of said profiles being joined by said curvilinear leading edge of said tip section, the rear ends of said chords being joined by a rectilinear trailing edge having an inboard section colinear with the trailing edge of said inboard blade section and a rearwardly swept rectilinear outboard portion.

6. A rotor blade in accordance with claim 5, wherein the span E of said tip section, the chord e of said outer profile, the distance m from the rear point of said outer profile to the leading edge line of the inboard blade section, the distance l from the front point of said outer profile to the leading edge line of the inboard blade section 1, and the distance d from the rear point of said outer profile to the trailing edge line of the inboard blade section are related as follows:

$0.3C \leq c \leq 0.7C$ $0.5C \leq E \leq 1.5C$ $0.5C \leq l \leq C$ $1.1C \leq m \leq 1.5C$ $0.1C \leq d \leq 0.5C$.

7. A rotor blade in accordance with claim 6, wherein $0.7C \leq E \leq 1.1C$.

8. A rotor blade in accordance with claim 1, wherein said angle of sweep $\phi$ has a value of 0°-15° at said first point of juncture and a value of 70°–85° at said terminal point.

9. A rotor blade in accordance with claim 1, wherein said tip section has a twist resulting from rotation of the chord of its successive profiles about a point located on each said chord at a distance equal to 25±5% of the length of said chord from its leading edge, the locus of points about which said rotations are effected being located in a plane defined by the chord of the inner end of said inboard blade portion having zero twist and an axis about which said inboard blade section is twisted.

10. A rotor blade in accordance with claim 9, wherein said tip section is twisted at an angle which varies linearly along the span of said tip section.

* * * * *